(12) United States Patent
Goodloe et al.

(10) Patent No.: US 12,181,985 B1
(45) Date of Patent: Dec. 31, 2024

(54) SMALL SPACECRAFT PROCESSING AND BUS ARCHITECTURE

(71) Applicant: United States of America as represented by the Administrator of NASA, Washington, DC (US)

(72) Inventors: Colby Goodloe, Greenbelt, MD (US); Luis Santos Soto, Wallops Island, VA (US); Charles Clagett, Greenbelt, MD (US); David Everett, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 271 days.

(21) Appl. No.: 17/159,338

(22) Filed: Jan. 27, 2021

Related U.S. Application Data

(60) Provisional application No. 62/966,249, filed on Jan. 27, 2020.

(51) Int. Cl.
*G06F 11/20* (2006.01)
*B64G 3/00* (2006.01)

(52) U.S. Cl.
CPC ............ *G06F 11/2028* (2013.01); *B64G 3/00* (2013.01)

(58) Field of Classification Search
CPC .............................. G06F 11/2028; B64G 3/00
See application file for complete search history.

(56) References Cited

U.S. PATENT DOCUMENTS

| | | | | |
|---|---|---|---|---|
| 6,072,433 | A * | 6/2000 | Young | G01S 19/53 342/386 |
| 6,298,289 | B1 * | 10/2001 | Lloyd | B64G 1/283 701/13 |
| 11,586,497 | B1 * | 2/2023 | Geist | B64G 1/223 |
| 11,780,612 | B1 * | 10/2023 | Kopardekar | H04W 4/46 701/13 |
| 2004/0078660 | A1 * | 4/2004 | Farwell | G06F 11/00 714/22 |
| 2004/0098140 | A1 * | 5/2004 | Hess | G05D 1/0077 700/19 |
| 2018/0285192 | A1 * | 10/2018 | Merl | G06F 11/0736 |

* cited by examiner

*Primary Examiner* — Nadeem Iqbal
(74) *Attorney, Agent, or Firm* — Derek J. Langdon; Matthew F. Johnston; Trenton J. Roche

(57) ABSTRACT

A spacecraft computing system, including: a first processor configured to process data from a payload and a first spacecraft system; a second processor configured to process data from a second spacecraft system; an interface connected to the second processor configured to interface with a third spacecraft system, wherein the second processor is configured to monitor the first processor and to initiate the recovery of the first processor when the first processor experiences a fault, wherein the first processor's processing capacity is greater the second processor's processing capacity, and wherein the second processor is more reliable than the first processor.

12 Claims, 1 Drawing Sheet

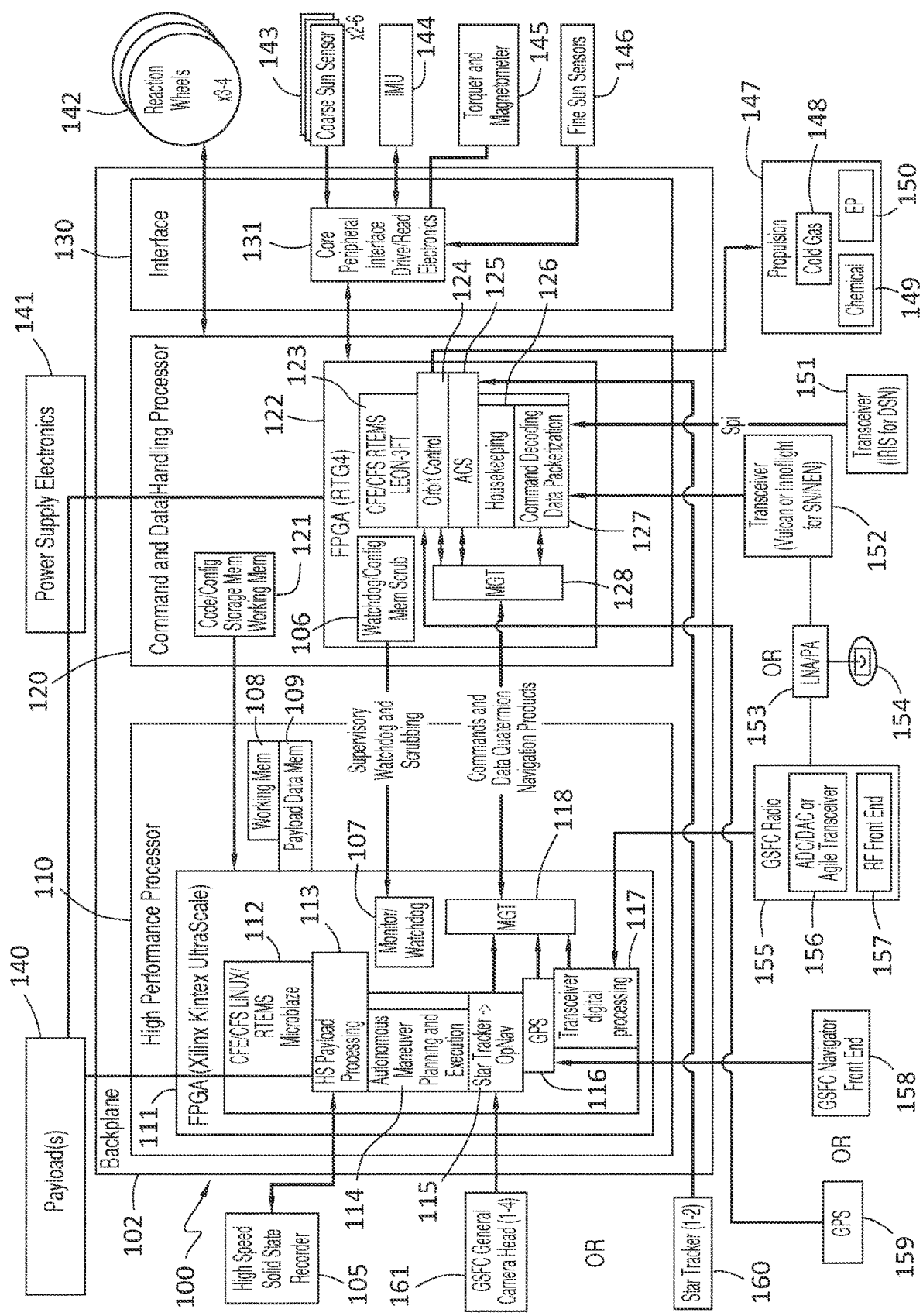

SMALL SPACECRAFT PROCESSING AND BUS ARCHITECTURE

This application claims priority to U.S. Patent Application No. 62/966,249, filed on Jan. 27, 2020, the entire disclosure of which is hereby incorporated for all purposes as if fully set forth herein.

ORIGIN OF THE INVENTION

The invention described herein was made by employees of the United States Government, and may be manufactured and used by or for the Government for Government purposes without the payment of any royalties thereon or therefore.

TECHNICAL FIELD

Example embodiments disclosed herein relate generally to small spacecraft processing and bus architecture.

BACKGROUND

The launch opportunities for SmallSat secondary and tertiary payloads has and will continue to significantly increase due in large part to the inclusion of EFLV (evolved expendable launch vehicle) secondary payload adaptor (ESPA) rings on most government missions that have excess lift capacity, initiatives to include rideshares alongside large NASA missions, and the proliferation of commercial launch services. Science investigators are taking advantage of the initiatives, opportunities, and capabilities by proposing advanced mission concepts and architectures that require a robust, reliable, and radiation hardened spacecraft processing and bus. They are pushing to achieve decadal-class science goals with small, focused missions. But current flight proven reliable and radiation hardened spacecraft processing and bus options from industry are limited or not available.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a spacecraft computing system, including: a first processor configured to process data from a payload and a first spacecraft system; a second processor configured to process data from a second spacecraft system; an interface connected to the second processor configured to interface with a third spacecraft system, wherein the second processor is configured to monitor the first processor and to initiate the recovery of the first processor when the first processor experiences a fault, wherein the first processor's processing capacity is greater the second processor's processing capacity, and wherein the second processor is more reliable than the first processor.

Various embodiments are described, wherein the first processor implements one of autonomous maneuver planning and execution function, star tracking, global position system function, and transceiver digital processing.

Various embodiments are described, wherein the second processor implements one of orbit control, attitude control system, housekeeping, command decoding, and data packetization.

Various embodiments are described, wherein the first processor implements a management function configured to monitor and manage the operation of the first processor.

Various embodiments are described, wherein monitoring the first processor and initiating the recovery of the first processor is performed by a management function implemented by the second processor.

Various embodiments are described, wherein the first processor is configured to process data from one of a camera head, star tracker, GPS, navigator front end, or digital radio.

Various embodiments are described, wherein the one of a camera head, navigator front end, or digital radio do not have a processor.

Various embodiments are described, wherein the none of camera head, navigator front end, or digital radio have a processor.

Various embodiments are described, wherein the second processor is configured to process data from one of a transceiver, propulsion system, sun sensor, inertial measurement unit, and magnetometer.

Various embodiments are described, wherein the second processor is configured to control power supply electronics on the spacecraft.

Various embodiments are described, wherein the power supply electronics do not have a processor.

Various embodiments are described, wherein the second processor is configured to control reaction wheels on the spacecraft.

Various embodiments are described, wherein the second processor is configured to control a propulsion system on the spacecraft.

Various embodiments are described, wherein the first processors processing capacity is 100 times greater than the processing capability of the second processor.

Various embodiments are described, wherein the first processors processing capacity is 1000 times greater than the processing capability of the second processor.

Various embodiments are described, wherein the system is configured to survive a single event effect (SEE) of up to 37 MeV/cm2.

Various embodiments are described, wherein the first processor is configured to survive a total ionizing dose (TID) of at least 30 krad.

Various embodiments are described, wherein the second processor and interface is configured to survive a total ionizing dose (TID) of at least 100 krad with shielding.

Various embodiments are described, further comprising memory connected to the second processor, wherein the memory and the second processor are space grade components.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

FIG. 1 illustrates a processing system diagram of the spacecraft and its associated sensors and systems.

To facilitate understanding, identical reference numerals have been used to designate elements having substantially the same or similar structure and/or substantially the same or similar function.

DETAILED DESCRIPTION

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

An embodiment of a spacecraft processing and bus architecture described herein enables challenging and harsh environment mission architectures being proposed by NASA scientists, especially those pursuing planetary missions. This embodiment tailors balancing and scaling of programmatic and technical risks for Class-D missions. The architecture reduces the size, weight, and power while increasing flexibility and robustness by tightly integrating electronics and software for core subsystems and standardizing interfaces for more mission unique components. This highly integrated architecture leverages flexibility inherent in FPGAs and software. The onboard reconfigurability allows each mission to tailor the performance versus reliability and component configuration to meet their specific needs. The architecture also tiers the functional reliability and hardware that performs those functions.

The highest reliability tier would seek to obtain the highest reliability available with certain cost constraints. This tier includes a >90% uptime and should be able to deal with various transients, upsets, and radiation hazards found in space. This tier of reliability may be applied to various systems and functions. For example, it may apply to powering the spacecraft including batteries, solar arrays, and power switches. This tier may also include pointing the solar array towards the sun, so this would include torquers, reaction wheels, and coarse sun sensors. Ground communications may also fall in this tier and would include transmitters, receivers, a core flight processor, and any diagnostic systems to evaluate the health and status of the spacecraft. This tier may include thermal management including detecting thermal overloads or controlling survival heaters. An inertial measurement unit (IMU) and propulsion system may fall in this tier as well. Finally, this tier may include the ability for the recovery and repair of the processing systems in the spacecraft.

The medium reliability tier would seek to have a good mean time between failure (MTBF) that would be lower than the MTBF for the highest tier, and upsets to the system would be allowable in this tier. This tier may include functions such as fine pointing and position and velocity determination and control. These functions may include a star tracker, GPS, optical celestial navigation cameras, and a radio.

The lowest reliability tier would seek to achieve moderate reliability on the order of >75% uptime. This tier would be associated with science operations and associated autonomy, instrument servicing, autonomous targeting selection, onboard data processing, data compression and any kind of analysis to reduce data volume, etc.

These different tiers of reliability can be used to determine the processing and bus architecture of the small spacecraft. Accordingly, the low and medium tier functions and hardware systems may be designed to have lower reliability but higher performance. Likewise, the highest tier functions and hardware systems will be designed to have high reliability but do not require the same high processing performance as the other functions. This architecture also allows for two tiers of processing capability. Because of a relaxed reliability requirement, high performance processing may be included. This allows for a more integrated system because sensor and control systems without their own processor may be used, and the high performance processor may process the various data from the sensor and control systems. This increased integration of the various functions decreases the size, weight, and power of the spacecraft resulting in a smaller spacecraft. Also, this increased integration allows for new functions that can take advantage of access to the various data received from the various sensors. For example, autonomous navigation may be possible with this highly integrated approach, where the spacecraft can decide on its own where to navigate instead of depending upon ground instructions. Further, the disclosed system architecture meets the various requirements that arise in a spacecraft, such as operating in a high radiation environment and having a proper magnetic cleanliness for science operations.

FIG. 1 illustrates a processing system diagram of the spacecraft and its associated sensors and systems. The processing system 100 includes a backplane 102. Connected to the backplane 102 are a high performance processor 110, a command and data handling processor 120, and an interface 130.

The high performance processor 110 has the capability to implement various spacecraft functions as well as carrying out processing for various payloads included on the spacecraft. Because higher performance processors are not as resistant to a harsh space environment, they do not have the high reliability required for certain functions. The functions implemented on the high performance processor 110 are tolerant of periodic failures and resets of the high performance processor 110. Because of the processing capabilities of the high performance processor 110, various spacecraft systems that traditionally had their own processor now can use the high performance processor 110 to carry out processing tasks. As previously discussed, replacing traditional systems that have an embedded processor per sensor and other control components reduces the size, weight, and power of these other systems.

The command and data handling processor 120 is a highly reliable processor that is much more resistant to a harsh space environment. Hence, the command and data handling processor 120 handles various processing and control tasks that need to be highly reliable and highly available. Further, the command and data handling processor 120 may include watch dog functions that monitor the performance and operation of the high performance processor 110. When the command and data handling processor 120 detects problems with the high performance processor 110, it may take the necessary actions in order to overcome the problems and may reset elements of the high performance processor 110 or the whole system as needed or perform memory scrubbing.

The interface 130 provides the needed interfaces within the processing system 100 and with external devices and systems. The interface 130 may include core peripheral interface drive and read electronics 131. The interface 130 is flexible and may implement a variety of different interface protocols as needed. Further the interface 130 is implemented using hardware that is able to withstand a harsh space environment with high reliability and high availability. The command and data handling processor 120 may also monitor the interface 130 and provide resets and other needed commands and control in order to overcome upsets or other interface issues that might arise.

The high performance processor 110 may include a field programmable gate array (FPGA) 111, working memory 108, and payload data memory 109. The FPGA 111 may be for example a Xilinx Kintex UltraScale processor. The FPGA 111 may have a processing capability that is magnitudes greater (100× or 1000× or more) than the processing available in the command and data handling processor 120. The increase performance of the FPGA 111 does come at the expense of being more susceptible to a harsh space environment, but command and data handling processor 120 monitors the performance and operation of the high performance processor 110 to make up for the decreased reliability so that a large amount of processing is available to process the various sensor data. The working memory 108 is the memory used by the FPGA. The payload data memory 109 may store data related to the specific payload on the spacecraft.

The FPGA 111 may use various operating systems. For example, it may use Linux, Real-Time Executive for Multiprocessor Systems (RTEMS), or other Real Time Operating System (RTOS) as the operating system. Additional software frameworks, for example, core Flight System (cFS) may be implemented on top of the lower level operating system. Further, the FPGA may use a soft processor such as Xilinx MicroBlaze. The FPGA 111 may implement a number of different functions such as payload processing 113, autonomous maneuver planning and execution 114, star tracker for optical navigation 115, GPS 116, and transceiver digital processing 117. The payload processing 113 may include executing software specific to any payload that the spacecraft is carrying. The payload may include sensors that measure data which is further processed by the FPGA 111. As previously noted, because the FPGA is a high performance processor such processing may be offloaded from the payload 140 to the FPGA. This reduces the size, weight, power, and cost associated with the payload.

The autonomous maneuver planning and execution 114 may process various sensor and navigation data available to carry out autonomous maneuvers. The star tracker for optical navigation 115 may be implemented by software executing in the FPGA 111 that processed data received from cameras to facility optical navigation. Again this means that a separate processor is not needed to provide star tracking based navigation.

The GPS 116 function may be implemented by software running on the FPGA 111. The FPGA 111 will receive GPS signal data (when available) from a GPS front end and then process that GPS data to provide navigation information.

Digital radios, including Software Defined Radios, may be used in the spacecraft. In that situation, the transceiver digital processing 117 may process digital data from a radio receiver to provide various data communication capabilities to the spacecraft. Again, this means that a separate processor is not needed for the digital radio.

The high performance processor 111 may also include a monitor/watchdog module 107. The monitor/watchdog module 107 interacts with a watchdog/configuration memory scrub module 128 in the command and data handling processor 120. The monitor/watchdog module 107 may run diagnostics to assesses the health, status, provide heartbeats, and performance of the high performance processor 110 and make that information available to the command and data handling processor 120. The monitor/watchdog module 107 may provide the watchdog function, FPGA configuration memory scrubbing, soft and hard resets, and storage during resets.

The high performance processor 111 includes a MGT function 118 that facilitates high speed data transfer with a MGT function 128 in the command and data handling processor 120.

The command and data handling processor 120 may include a FPGA 122 and a working memory 121. The working memory 121 may store code, configuration data, and other data. The working memory 121 is a space grade memory that is of a space qualified radiation hardened design in order to provide high reliability for the command data handling processor 120. The FPGA 122 is a space-grade FPGA that is of a space qualified radiation hardened design that allows for high reliability operation in the presence of a harsh space environment. For example, the command and data handling processor 120 and the FPGA 122 may be able to survive single event effects (SEE) of up to 37 MeV/cm$^2$ and a total ionizing dose (TID) of at least 30 krad and with shielding a TID of at least 100 krad. The FPGA 122 may include an operating system such as cFS on RTEMS and may support the LEON-3FT software libraries. The FPGA 122 may implement various functions such as orbit control 124, attitude control system (ACS) 125, housekeeping 126, and command decoding and data packetization 127. The orbit control function 123 determines the current orbit of the spacecraft and then determines what commands may need to be issued to various systems to affect the orbit of the spacecraft. This may include commands to the propulsion system 147 of the spacecraft.

The ACS function 125 determines the attitude of the spacecraft based upon for example data from a star tracker camera 160 and 161, coarse sun sensors 143, a fine sun sensor 146, a magnetometer 145, or propagation of attitude using IMLUs 144. The ACS may send commands to reaction wheels 142 or magnetorquers 145 in order to adjust the spacecraft attitude. Such changes in attitude may include making real-time adjustments to keep the spacecraft in a desired attitude and changing the attitude of the spacecraft based upon an attitude change command.

The housekeeping function 126 monitors the status of various systems in the spacecraft and may monitor temperature, voltages, currents or other indications of how the various systems are doing. The housekeeping function 126 may also run various diagnostic tests of various spacecraft and processor systems. When these measured parameters and diagnostic test results steps out of desired ranges for a pre-determined amount of time, the housekeeping module may then initiate steps required to mitigate the problem.

The FPGA 122 may also implement command decoding function 127. The command decoding function 127 may receive commands from different radio receivers. These commands may then be demodulated and decoded and send to the appropriate processor or subsystem for action. Further the command decoding function 127 may also packetize data as needed.

As previously discussed above, the FPGA 122 includes a watchdog/configuration memory scrub module 128. The watchdog/configuration memory scrub module 128 interfaces with the monitor watchdog module 118 of the high performance processor 110. The watchdog/configuration memory scrub module 128 carries out the monitoring of the high performance processor to ensure that the high performance processor is functioning properly. This may be done by executing various watch dog commands and protocols to determine that the high performance processor 110 is properly operating. Further, the watchdog/configuration memory scrub module 128 may also provide fault detection and correction for other parts of the system as well. The function may provide current trip monitoring, load shedding, safe mode, resets, command loss timers, and limit checking.

The command and data handling processor 120 may also take on processing tasks from external sensors allowing the sensors to be smaller, lighter, and to consume less power. This also has the benefit of providing those systems with highly reliable computing capability to increase the overall reliability of the system as each sensor system does not need to have their own radiation hardened and reliable space grade processor.

The spacecraft may include a variety of systems and sensors that are controlled by or interact with the computing system 100. The spacecraft may include various payloads 140. These payloads may include sensors of various types or science experiments. These payloads 140 may send data to the high performance processor 110 which carries out the needed data processing 113 and storage 105 (which may be a high speed solid state recorder) required by the payload 140. Also the payloads 140 may be monitored by the command and data handling processor 120 and receive needed information from the command and data handling processor 120.

The spacecraft may include power supply electronics 141. These power supply electronics 141 will control the power distribution of the spacecraft. These electronics are radiation hardened in order to perform reliably. These electronics will interface with various sources of power such as solar arrays, batteries, nuclear power generators, etc. and manage the power available and the distribution of power.

The spacecraft may include reaction wheels 142 that help to control the attitude of the spacecraft. The reaction wheels 142 include three or more different flywheels at different orientations that may be controlled to adjust the attitude of the spacecraft.

The spacecraft may include coarse sun sensors 143 and fine sun sensors 146. These may be used to sense the direction of the sun that may be use for example to position solar arrays for maximum power generation. Such information may be provided to the ACS 125 and the power supply electronics 141.

The spacecraft may also include an inertial measurement unit such as gyroscopes and accelerometers. The IMU provides data that may be used to determine the attitude and movement of the spacecraft.

The spacecraft may include a magnetic torquer and magnetometer 145 that are capable of measuring magnetic fields experienced by the spacecraft and adjusting the orientation through a reactions with the Earth's magnetic field. The torquer may provide momentum management for the wheels or adjust the orientation of the spacecraft.

The spacecraft may include a propulsion unit 147. The propulsion unit 147 may include cold gas propulsion 148, chemical propulsion 149, electrical propulsion 150, or any other type of propulsion. The propulsion system may receive commands and input from the obit control function 124.

The spacecraft may include one or more radio transceivers for transmitting and receiving data from the spacecraft. The spacecraft communication system may include an antenna 154 connected to a low noise amplifier and a power amplifier (LNA/PA) 153. The LNA/PA 153 may be connected to a transceiver 152 or a radio 155. The transceiver 152 may be used for operation in space and for interaction with the NASA's ground based SN/NEN systems. The transceiver 152 may be used for command of the spacecraft and data transmission, and the transceiver 152 may interact with the command decoding function 127.

The LNA/PA 153 may alternatively be connected to a radio 155. The radio 155 may include a ADC/DAC or agile transceiver 156 and an RF front end 157. The radio 155 may be a Goddard Space Flight Center (GSFC) radio. This radio provides a digital signal to the transceiver digital processing 117 in the high performance processor 110. The transceiver digital processing 117 implements the various radio functions.

Alternatively a transceiver 151 may be used by the spacecraft that communicates with NASAs deep space network (DSN). This transceiver 152 may include its own antenna and also communicate with the command decoding function 127 and provide commands to the spacecraft and data communication.

The spacecraft may include a navigation front end 158. The navigation front end 158 may be a GSFC front end. This front end receives navigation signals and provides them to the GPS function 116 in the high performance processor 110.

Alternatively, the spacecraft may also include a GPS sensor 159. The GPS sensor may send position data to the orbit control function 124.

The spacecraft may include different types of star trackers. A star tracker 160 may provide quaternion data to the ACS 125. Additionally, a GSFC general camera head in sends images to the star track, scanner, or optical navigation function 115 in the high performance processor.

As discussed above many of the systems and sensors of the spacecraft may interact with the processing system 100. These systems and sensors may not include their own processors and instead use the processing available in the processing system 100. Today many spacecraft that uses these systems and sensors use systems and sensors that include their own processing. This adds to the size, weight, and power of the spacecraft. By removing the processors from these systems and sensors and instead using the processing available in the processing system 100, a reduction in the size, weight, and power of the spacecraft may be achieved. Also by using a two part processor architecture, the processing system 100 is able to provide a combination of high performance processing and reliable processing in order to operate reliably in a harsh space environment.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A spacecraft computing system, comprising:
a first processor configured to process data from a payload and a first spacecraft system;
a second processor configured to process data from a second spacecraft system;
an interface connected to the second processor configured to interface with a third spacecraft system,
wherein the second processor is configured to monitor the first processor and to initiate a recovery of the first processor when the first processor experiences a fault, and
wherein the first processor's processing capacity is greater the second processor's processing capacity,
wherein the first processor implements each of an autonomous maneuver planning and execution function, star tracking, global position system function, and digital radio function;
wherein the second processor implements one of orbit control, attitude control system, housekeeping, command decoding, and data packetization;
wherein the first processor is configured to process data from at least one of a camera head, star tracker, GPS, navigator front end, or radio receiver and the at least one of a camera head, navigator front end, or radio receiver do not have a processor;
wherein the second processor is configured to process data from one of a transceiver, propulsion system, sun sensor, inertial measurement unit, and magnetometer.

2. The spacecraft computing system of claim 1, wherein the second processor implements a management function configured to monitor and manage an operation of the first processor, wherein monitoring the first processor and initiating the recovery of the first processor is performed by a management function implemented by the second processor; wherein the second processor is configured to control power supply electronics on the spacecraft.

3. The spacecraft computing system of claim 2, wherein the power supply electronics do not have a processor.

4. The spacecraft computing system of claim 3, wherein the second processor is configured to control reaction wheels on the spacecraft.

5. The spacecraft computing system of claim 4, wherein the second processor is configured to control a propulsion system on the spacecraft.

6. The spacecraft computing system of claim 5, wherein the second processor is configured to survive a single event effect (SEE) of up to 37 MeV/cm2.

7. The spacecraft computing system of claim 6, wherein the second processor is configured to survive a total ionizing dose (TID) of at least 30 krad.

8. The spacecraft computing system of claim 7, wherein the second processor and interface is configured to survive a total ionizing dose (TID) of at least 100 krad with shielding.

9. The spacecraft computing system of claim 8, further comprising memory connected to the second processor, wherein the memory and the second processor are space grade components.

10. The spacecraft computing system of claim 1, wherein the first processor configured to process data from a payload and a first spacecraft system is configured to process data from a plurality of spacecraft systems.

11. The spacecraft computing system of claim 1, wherein the first processor is configured to process data from each of a camera head, star tracker, GPS, navigator front end, or radio receiver and each of the camera head, navigator front end, or radio receiver do not have a processor.

12. A spacecraft computing system, comprising:
a first processor configured to process data from at least one payload and a first plurality of spacecraft systems;
a second processor configured to process data from a second plurality of spacecraft systems; and
an interface connected to the second processor configured to interface with a third spacecraft system,
wherein the second processor is configured to monitor the first processor and to initiate a recovery of the first processor when the first processor experiences a fault,
wherein the first processor's processing capacity is greater the second processor's processing capacity,
wherein the first processor is configured to receive a first plurality of data signals from the at least one payload and the first plurality of spacecraft systems,
wherein the first plurality of spacecraft systems comprises at least two of a camera head, a star tracker, a navigation front end, and radio receiver,
wherein the first plurality of spacecraft systems do not include an embedded processor for each of the first plurality of spacecraft systems,
wherein the second processor is configured to receive a second plurality of data signals from the second plurality of spacecraft systems,
wherein the second plurality of spacecraft systems comprises at least two of a transceiver, propulsion system, sun sensor, inertial measurement unit, and magnetometer,
wherein the first processor implements each of an autonomous maneuver planning and execution function, star tracking, global position system function, and digital radio function based on the received first plurality of data signals processed by the first processor, and
wherein the second processor implements each of orbit control, attitude control system, housekeeping, command decoding, and data packetization based on the received second plurality of data signals processed by the second processor.

* * * * *